Feb. 27, 1968   S. F. MILLER ET AL   3,370,385
WHEEL DRESSER

Filed May 24, 1965   3 Sheets-Sheet 1

INVENTOR.
STEWART F. MILLER
FRANK PERNACK
CARL J. RADTKE
BY Whittemore, Hulbert
& Belknap
ATTORNEYS Feb. 27, 1968   S. F. MILLER ET AL   3,370,385
WHEEL DRESSER
Filed May 24, 1965   3 Sheets-Sheet 2
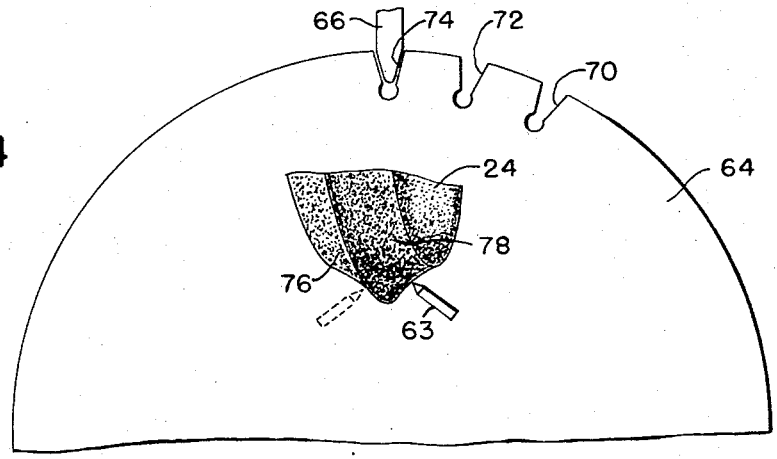
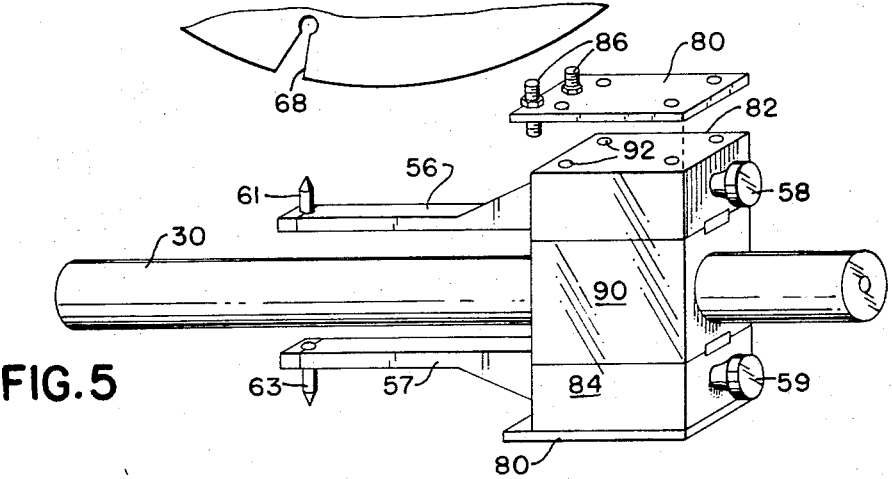
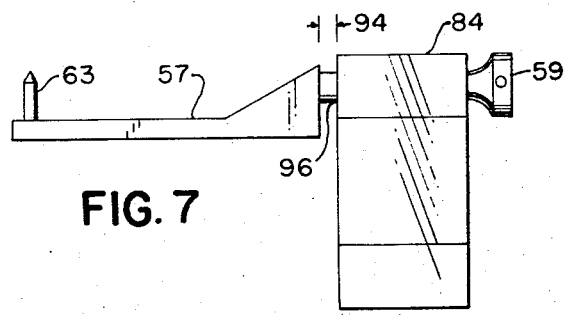
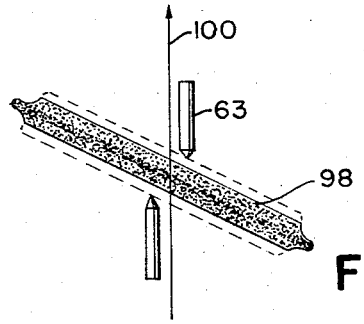
INVENTOR.
STEWART F. MILLER
FRANK PERNACK
BY CARL J. RADTKE
Whittemore, Hulbert
& Belknap   ATTORNEYS

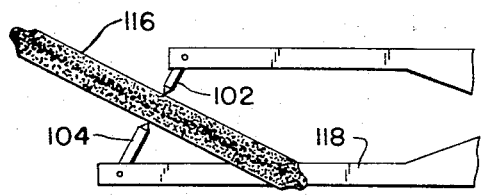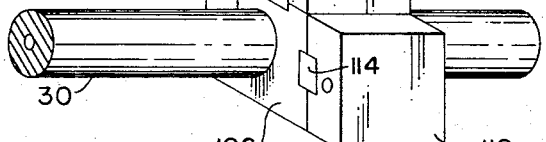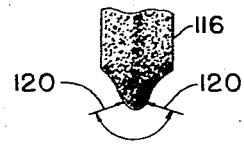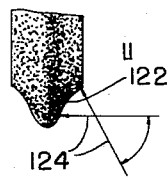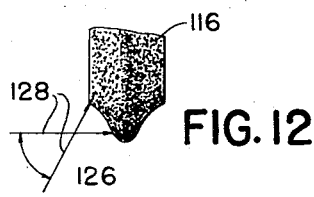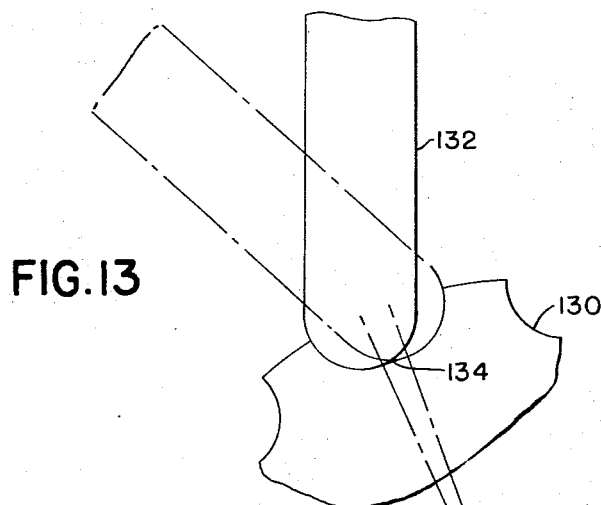

United States Patent Office 3,370,385
Patented Feb. 27, 1968

3,370,385
WHEEL DRESSER
Stewart F. Miller, Roseville, Frank Pernack, Birmingham, and Carl J. Radtke, Warren, Mich., assignors to National Broach & Machine Company, Detroit, Mich., a corporation of Michigan
Filed May 24, 1965, Ser. No. 458,142
7 Claims. (Cl. 51—5)

ABSTRACT OF THE DISCLOSURE

A wheel dresser for a gear grinder mounted for movement in a helical path along the axis of a work gear support comprising separate profile and periphery trimmers, each including an elongated diamond holder, means for swinging the trimmers in planes perpendicular to the axis, means for shifting the profile trimmers by predetermined increments parallel to the wheel axis, in which the holders extend generally perpendicular to the plane of the wheel.

It is an object of the present invention to provide a wheel dresser for use on a gear grinder provided with means effective to rotate wheel dressing elements in accordance with movement thereof parallel to the axis of a gear on the grinder, and associated with index mechanism so as to effect grinding of a required profile at opposite sides of a gear wheel.

It is a further object of the present invention to provide a wheel dresser for a gear grinder including means for shifting a trimming element by a predetermined increment in a direction parallel to the axis of a work gear in order to control wheel thickness.

It is a further object of the present invention to provide a wheel dresser for a gear grinder including pivot mounting means for diamonds in order to move the diamond in circular arcs during a trimming operation.

It is a further object of the present invention to provide in a wheel dresser as described in the preceding paragraph, a pair of pivot mountings for diamonds, one of which is adapted to move in a concave arcuate path in order to trim the periphery of a grinding wheel and the other of which is movable in a convex arcuate path to provide the required shape on the edge portions of the grinding wheel.

It is a further object of the present invention to provide a wheel dresser including means for swinging the diamonds a wheel dresser including means for swinging the diamonds in the transverse plane, the diamonds being mounted in the normal plane.

It is a further object of the present invention to provide a wheel dresser as described in the preceding paragraph in which three trimming members are provided, one for each side of the wheel and a third for the periphery thereof.

Other objects and features of the invention will become apparent as the description proceeds, especially when taken in conjunction with the accompanying drawings, illustrating preferred embodiments of the invention, wherein:

FIGURE 4 is a view similar to FIGURE 3 showing the relationship between the wheel, a pair of trimming elements, the index plate, and the locating plunger.

FIGURE 5 is a perspective view of a trimmer mounted on a rotatable shaft.

FIGURE 6 is a diagrammatic view illustrating the effective change in thickness of a wheel resulting from shifting the trimming element parallel to the work axis.

FIGURE 7 is an elevational view of a single trimming element illustrating means for shifting the trimming element.

FIGURE 8 is a fragmentary elevational view illustrating an arrangement of diamond support elements.

FIGURE 9 is a perspective view of a trimmer comprising three independent trimmer support blocks.

FIGURES 10, 11 and 12 are fragmentary sectional views through a wheel illustrating a dressing operation by trimmers mounted on each of the blocks illustrated in FIGURE 9.

FIGURE 13 is an exaggerated view illustrating a grinding operation including the grinding of a root space concentric with the axis of the gear.

The present invention relates to improvements in gear grinders and more particularly in wheel dressers used for trimming the grinding wheels and gear grinders of the type in which a diamond element during a trimming operation is caused to trace out or generate a helicoidal surface. If the tooth form on the gear to be ground is involute the surfaces traced by the diamonds will be involute helicoidal surfaces. If the gearing is of the type in which the teeth measured in the normal plane are arcuate (such for example as Novacoff gearing) the diamonds are swung in arcuate paths relative to the trimmer while the trimmer or dresser as a whole is caused to move in a spiral path having the same lead as the teeth of the work gear.

The present invention is thus applicable generally to all types of gearing but for simplicity it is illustrated and described herein as designed for use in the circular arc Novacoff gearing.

Figure 1:
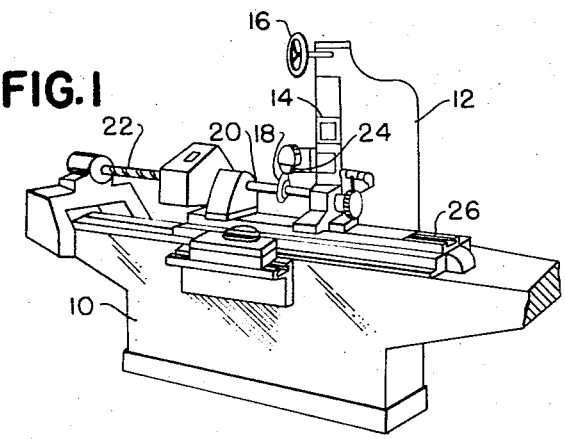
FIGURE 1 is an elevational view of a gear grinder of the type to which the present application is applicable.

Referring now to the figures, FIGURE 1 illustrates a grinder 10 having a column 12, angularly adjustable about a vertical axis, on which is mounted a wheel slide 14 adapted to be moved vertically by suitable means such for example as a hand wheel 16. A work gear 18 is illustrated in position on a shaft or arbor 20 and suitable means are provided for causing the shaft, and hence the gear 18, to rotate as it is axially advanced. This mechanism is herein illustrated as comprising a lead bar 22 associated with a nut or the like so that as the lead bar, which is coaxial with the shaft 20, is reciprocated, rotation is imparted to the shaft 20. It will be appreciated that for grinding a helical gear, the grinding wheel here designated 24, is adjusted around a vertical axis until its plane corresponds to the helix angle of the gear. Thus, as the gear is spiraled through the wheel, the wheel grinds a helicoidal form on the teeth of the gear.

It has been found that when grinding involute teeth, some interference exists between the grinding wheel and a perfectly formed involute or other helicoidal surface on the work gear. This has called for modification of the wheel resulting from rather complicated calculations and as the wheel is reduced in diameter, the wheel modification must continuously be recalculated.

In accordance with the present invention, trimming elements which are mounted on the slide 26 of the grinder trim the grinding wheel in the transverse plane (that is, the plane perpendicular to the axis of the gear) and are swung in this plane in accordance with the desired profile on a gear tooth as measured in the transverse plane, while the support for the trimming element or diamond is moved in a spiral path having the same lead as the work gear, the grinding edge portion of the wheel will automatically be formed to that form which reproduces the exact form desired on the gear, without interference. This operation continues without requiring computation or adjustments throughout the life of the grinding wheel since it is independent of the diameter of the grinding wheel.

The wheel dresser or trimming mechanism is mounted on the right hand end of the work support slide as seen in FIGURE 1, and has associated therewith a shaft which is coaxial with the shaft 20 mounting the work gear 18. This shaft, seen at 30 in FIGURE 2, may in fact be driven in rotation by the lead screw 22 although as illustrated herein adjustable sine bar mechanism is provided for the purpose.

Figure 2A:
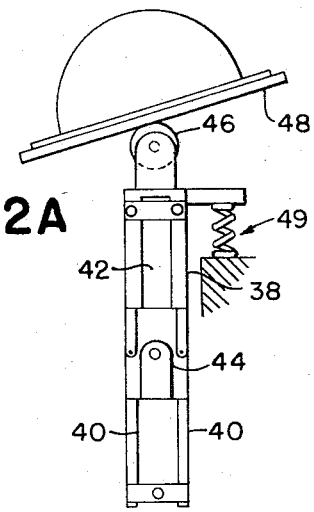
FIGURE 2A is a fragmentary plan view of the sine bar mechanism associated with the wheel dresser of FIGURE 2.
Figure 2:
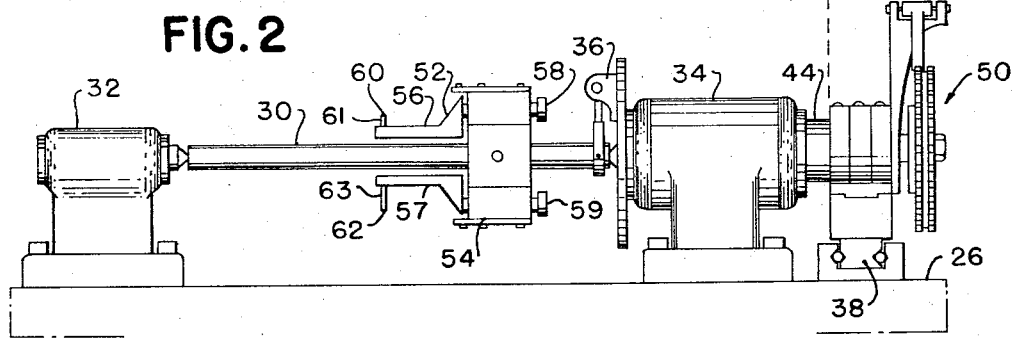
FIGURE 2 is a plan view of the trimming mechanism which is adapted to be mounted on the gear grinder.

Referring now to FIGURE 2 there is illustrated a portion of the work slide 26 supporting the shaft 30 between stocks 32 and 34, the stock 34 being a tailstock having driving mechanism indicated at 36 connected to the shaft 30. The driving mechanism 36 is driven in rotation as a result of movement of the slide 26 to the right or left, as seen in FIGURE 2, by means of sine bar mechanism comprising a slide 38 having tapes 40 and 42 connected at the outer ends thereof and wound in opposite directions around a base roll 44 which is secured in driving relation to the driver 36. The slide 38 at its outer end has a roller 46 which is engageable with a sine bar 48. Suitable spring means 49 retain the roller 46 against the guide surface of the sine bar 48. The sine bar 48 is angularly adjustable to change the spiral rotation of the shaft 30. By appropriate adjustment of the sine bar 48, the shaft 30 may be caused to rotate in accordance with axial movement in exactly the same relationship as the lead bar 22 which drives the work gear 18.

The driver 36 is connected to the base roll 44 through suitable index mechanism indicated generally at 50.

The dressers, which are herein illustrated as two in number, are shown at 52 and 54 and comprise arms 56 and 57 pivoted to swing about the axes of shafts connected to the actuating knobs 58 and 59 respectively. As seen in FIGURE 2, the dresser 52 includes a trimming element or diamond at 60 carried by a holder 61 which is mounted to extend to a point below the extended axis of the shaft connected to the knob 58. Thus, the diamond at 60 will traverse a concave path and is adapted to trim a correspondingly convex surface on the wheel. On the other hand, the diamond whose position is indicated at 62 carried by the holder 63 is located at the opposite side of the shaft connected to its actuating knob 59. In operation, the table or slide 26 is reciprocated slowly between positions which cause the trimmers or dressers to pass directly beneath the lower peripheral portion of the grinding wheel. This slow travel of the table or slide, through the sine bar mechanism, causes the trimmer to move in a spiral path. As this occurs the operator by back and forth rotation of the appropriate knob 58 or 59, causes the corresponding diamond element to traverse an arcuate helicoidal path which is identical with the arcuate helicoidal path occupied by a tooth of the work piece when it in turn is traversed and rotated in grinding engagement with the grinding wheel.

Figure 3:
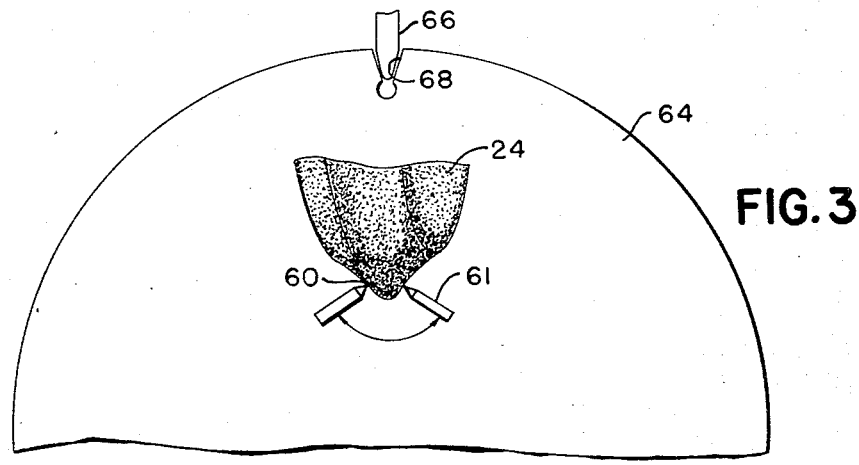
FIGURE 3 is a diagrammatic view illustrating the relationship between the bottom edge portion of a grinding wheel and a single trimming element, an index plate, and a locating plunger.

Referring to FIGURE 3, a portion of an index disc 64 is illustrated in which a locating plunger 66 is received in a locating notch 68. With the parts in this position the diamond or trimming element at 60 is caused to swing from side to side of the wheel in a plane perpendicular to the axes of the shafts 20 and 30 so as to trim a rounded periphery on the grinding wheel 24. It will be recalled that the grinding wheel is set around to the helix angle of the work gear and hence, the trimming operation takes place in a plane which is oblique to the axis of the grinding wheel. As a result, the surface which is ground onto the outer peripheral portion of the grinding wheel is not itself arcuate in a plane perpendicular to the axis of the grinding wheel. However, it is the surface which is required on the grinding wheel to produce a truly arcuate root surface on a work gear which is ground thereby in conventional fashion, when the tooth profile of the work is checked, as is usual in the transverse plane.

In FIGURE 3 the three notches in the disc or index plate 64 opposite the notch 68 are designated 70, 72 and 74.

Referring now to FIGURE 4 there is shown the change in relationship of parts required to bring the trimmer 54 into position to trim opposite side surface portions 76 and 78 of the grinding wheel 24. It will be observed that the notch 68 which is diametrically opposite the notch 72, is not directly opposite the notch 74 in which the plunger 66 is located, but instead, the wheel has been rotated somewhat more or less than 180 degrees. It will noted however, that the notches 70 and 74 are equally spaced from the intermediate notch 72 which is exactly 180 degrees from the notch 68. The index plate is designed so that the dresser can be swung from side to side by engaging the plunger selectively in notches 66 or 70 to coincide with the degree of arc needed. By way of a specific example, suppose that 10 degrees is needed on each side, then a 36-toothed index plate may be used so that from notch 72 to either notch 74 or notch 70 will be 10 degrees. With this arrangement the single trimmer 54 can be adjusted through an arc of approximately 20 degrees to trim either of the surfaces 76 or 78 on the grinding wheel.

Referring now to FIGURE 5 there are illustrated plates 80 adapted to be fastened to blocks 82 and 84 respectively, the plates extending beyond the ends of the blocks adjacent the diamond holders 61 and 63. Adjustable stop screws 86 are provided and are adapted to be engaged by the side surfaces of arms 56 and 57 when the required movement in a trimming oscillation of the diamond is completed. It will be recalled that the diamond holders 61 and 63 are rotated by manipulation of the knobs 58 and 59 respectively, while the trimming mechanism as a whole is rotated in accordance with its axial movement by the shaft 30.

Referring now to FIGURES 6 and 7 there is illustrated a further adjustment of the trimmer. The plates 80 are secured through the blocks 82 and 84 to the main support block 90. The holes 92 in the blocks 82, 82 through which the screws (not shown) extend are elongated so that the trimmers may be adjusted slightly in a direction parallel to the axis of the shaft 30. In addition, as best seen in FIGURE 7, a calculated gap as indicated at 94, is provided between the enlarged end of the arm 57 and the block 84. The shaft 96 which connects the knob 59 with the arm 57 is longitudinally slidable in the block and the arm 57 may be shifted from the illustrated position of FIGURE 7 to a position in which it is moved to the right by an amount equal to the gap 94. The result of this movement is illustrated in FIGURE 6 where a wheel 98 is illustrated as adjusted to the required angular position and the two positions of the diamond support 63 are shown. The arrow 100 represents an intermediate position and it will be observed that by shifting the trimmer arm 57 from a limiting position to the right to a limiting position to the left will shift the plane of movement of the diamond as illustrated in the figure. The result is that the wheel 98 or the portion thereof trimmed by the diamonds, is widened from the full line position to the dotted line indicated in the figure.

In practical operation the operator either pushes or pulls on the knob 59 to set the diamond in the required position for trimming one side of the wheel and after one side of the wheel has thus been trimmed, the arm is swung to the other side of the wheel, the index plate moved two notches as indicated in FIGURE 4, and the knob 59 is moved to the other limiting position.

While the illustrated embodiment so far has shown wheels trimmed to be used on-center, using both sides of the wheels simultaneously, the trimmer is of course useful for trimming grinding wheels to be used in grinding off-center. In this case however, only one side of the wheel can be used at a time. This calls among other things for further offsetting of the trimmer by adjustment of the index plate. This method of grinding is particularly desirable when grinding steels that burn easily. Using the off-center grinding method creates a condition where the actual grinding is done closer to the center of the wheel with the result that cooler grinding is obtained.

Referring now to FIGURE 8 there is illustrated a somewhat different manner of mounting the diamond holders here designated 102 and 104. This has the result of varying the diamond setting from the transverse plane to the normal plane of the wheel. However, the trimming operation still takes place in the transverse plane. In order to employ the diamond holders as illustrated in FIGURE 8, a dresser of the type illustrated in FIGURE 9 is required. In this dresser the shaft 30 carries a main support 106 on which three dresser supporting blocks 108, 110 and 112 are mounted, each of which is independently adjustable in a direction parallel to the axis of the shaft 30 by means of keys 114. It will be understood that a trimmer is mounted on each of the blocks 108, 110 and 112, and that the trimmers on the blocks 108 and 112 are used alternately for trimming opposite sides of the grinding wheel designated 116 in FIGURE 8. This is necessary because the holders as illustrated in FIGURE 8, are substantially perpendicular to the plane of the grinding wheel 116. However, it will be appreciated that if the arm 118 carrying the holder 104 were swung to present the diamond in the holder 104 at the opposite side of the wheel, the holder would extend at an oblique angle to the plane of the wheel.

The dresser mounted on the block 110 will be used to trim the outer periphery of the wheel 116 to the shape required in FIGURE 10, the arrows 120 indicating generally the positions of the elongated holders 104 at limiting positions of the stroke.

In FIGURE 11 there is illustrated the arrangement for grinding the surface portion of the wheel designated at 122 and the arrows 124 indicate limiting positions of the diamond holder 104.

In FIGURE 12 there is illustrated the arrangement for grinding the surface 126 of the grinding wheel 116 and the arrows 128 designate limiting positions of the diamond holder 102.

Referring now to FIGURE 13 there is illustrated the manner of trimming the root of circular arc gearing, a portion of which is indicated at 130. In this figure the portion of the grinding wheel is indicated at 132 and is provided with a true radius when checked in the transverse plane. This will trim in a helical path as the wheel is spiraled through the grinding wheel. The intermediate portion of the tooth space as indicated by the reference character 134, is ground by rolling the gear circumferentially on its axis as it passes through the grinding wheel. The arrangement illustrated was formed with a 36-tooth index plate and the trimming was done with the index plate set two notches or 20 degrees off-center. The result is a tooth space having arcuate helicoidal side surfaces and a root surface which is a spiral segment of a cylinder.

The drawings and the foregoing specification constitute a description of the improved wheel dresser in such full, clear, concise and exact terms as to enable any person skilled in the art to practice the invention, the scope of which is indicated by the appended claims.

What we claim as our invention is:

1. A gear grinder having a slidable work support table provided with means thereon for mounting a helical work gear, means for rotating the helical work gear in accordance with movement of the table, a wheel support for supporting a grinding wheel in position to be traversed by a work gear upon movement of the table, means for adjusting the grinding wheel about an axis perpendicular to and intersecting the axis of the work gear to cause the plane of the wheel to conform to the inclination of a tooth space in which the wheel is engaged, a wheel dresser on the table including a shaft having its axis coincident with the axis of the work gear, means for rotating the shaft in accordance with sliding movement of the table, a pair of dresser mechanisms on said shaft one of which is adapted to trim the periphery of a wheel to convex cross-section and the other of which is adapted to trim a side portion of the wheel to tooth profile conforming cross-section, and index means for indexing said shaft selectively to bring said dresser mechanisms into operative relation to the wheel.

2. A gear grinder as defined in claim 1 in which said other dresser mechanism is shiftable into two positions in which it is used to dress opposite side portions of the wheel to tooth profile conforming cross-section.

3. A gear grinder as defined in claim 1 in which said index means comprises an index plate having notches located so that a first notch is engaged when the said one dresser mechanism is employed, and two notches spaced equally from a second notch diametrically opposite the first notch are selectively engaged when dressing the opposite side portions of the wheel.

4. A wheel dresser for use in dressing a grinding wheel set at an angle for grinding helical gears, said dresser comprising a rotatable support positioned with its axis coincident with the axis of rotation of a work gear, means for rotating the support in accordance with movement axially of the work gear, a trimming element on said dresser, means for moving the trimming element in a curved path in accordance with a form desired on the tooth of a work gear, and means for shifting said trimming element relative to said dresser parallel to the axis of the work gear by predetermined increments so as to determine the circumferential spacing between trimmed side portions of the wheel.

5. A wheel dresser for use in dressing a grinding wheel used in grinding circular arc gearing comprising a grinder having a rotary support having an axis of rotation coincident with the axis of rotation of a work gear on the grinder, a pair of wheel dressers each including a trimming element, means for rotating one of said trimming elements to dress a convex peripheral portion of the wheel by movement of the trimming element in a circular arc, and means for rotating the other of said trimming elements in a circular arc effective to trim a concave side portion of the wheel to tooth profile conforming cross-section.

6. A wheel dresser as defined in claim 5 which comprises means for adjusting the last mentioned trimming element relative to said rotary support through a substantial arc so as to trim first one side portion of the wheel and then the other.

7. A wheel dresser for a helical gear grinder comprising a rotary support having its axis parallel to the axis of a gear support on the grinder, a trimmer on the support, means for traversing the support parallel to its axis, means for rotating the support in timed relation to its traverse, index means for positioning said trimmer, said trimmer including means for moving a trimmer element in a path conforming to a gear tooth profile, means for shifting said trimmer element parallel to said support, and stop means for limiting shifting movement of said trimmer element to cooperate with said index means to determine the exact relationship between the trimming element as it is traversed and rotated with said support and moved in the required gear tooth profile relative to said support.

References Cited

UNITED STATES PATENTS

| | | | |
|---|---|---|---|
| 2,237,977 | 4/1941 | Wainwright | 125—11 |
| 2,328,826 | 9/1943 | McQuillan | 125—11 |
| 3,067,733 | 12/1962 | Pernack et al. | 125—11 |
| 3,299,577 | 1/1967 | Pernack et al. | 51—5 |

LESTER M. SWINGLE, *Primary Examiner.*